United States Patent [19]

Furuta et al.

[11] Patent Number: 5,029,920
[45] Date of Patent: Jul. 9, 1991

[54] BUMPER STRUCTURE

[75] Inventors: Katsumi Furuta, Isehara; Satoru Shinozaki, Sagamihara, both of Japan

[73] Assignee: Nissan Motor Co., Ltd., Yokohama, Japan

[21] Appl. No.: 598,944

[22] Filed: Oct. 17, 1990

[30] Foreign Application Priority Data

Oct. 20, 1989 [JP] Japan .................................. 1-273090

[51] Int. Cl.$^5$ .............................................. B60R 19/24
[52] U.S. Cl. ...................................... 293/154; 293/102
[58] Field of Search ................ 296/194, 901; 293/102, 293/115, 120, 154, 155

[56] References Cited

U.S. PATENT DOCUMENTS

| | | | |
|---|---|---|---|
| 4,193,621 | 3/1980 | Peichl et al. | 293/155 X |
| 4,483,559 | 11/1984 | Lewis et al. | 293/155 X |
| 4,753,467 | 6/1988 | DeCaluwe et al. | 293/155 X |
| 4,838,593 | 6/1989 | Fleming et al. | 293/154 X |
| 4,875,728 | 10/1989 | Copp et al. | 293/154 X |

FOREIGN PATENT DOCUMENTS

| | | | |
|---|---|---|---|
| 3407985 | 10/1985 | Fed. Rep. of Germany | 293/155 |
| 18540 | 1/1982 | Japan | 293/154 |
| 18541 | 1/1982 | Japan | 293/154 |
| 4443 | 1/1985 | Japan | 293/154 |

*Primary Examiner*—Margaret A. Focarino
*Assistant Examiner*—Joseph D. Pape
*Attorney, Agent, or Firm*—Foley & Lardner

[57] ABSTRACT

A bumper structure for a vehicle is disclosed, which includes a first bracket secured to a front fender panel near an inwardly bent first flange of said front fender panel, a bumper fascia having an inwardly bent second flange which is mated with the first flange, the second flange being divided into upper and lower portions leaving therebetween a slit, a main retainer extending along the lower portion of the second flange, a sub-retainer having a second bracket which is to be mated with the first bracket, a first structure for achieving a pivotal connection between the first flange, the lower portion of the second flange, the sub-retainer and the main retainer, and a second structure for connecting the upper portion of the second flange to the sub-retainer.

10 Claims, 3 Drawing Sheets

BUMPER STRUCTURE

BACKGROUND OF THE INVENTION

1. Field of the Invention

The present invention relates in general to a bumper structure of a motor vehicle, and more particularly to a bumper structure including a bumper fascia.

2. Description of the Prior Art

Some of light duty motor vehicles are equipped with bumper structures of a type having a plastic bumper fascia.

An example of prior art bumper structure of the above described type is shown in FIGS. 4-7 of the accompanying drawings. As is shown in FIG. 4, some of conventional bumper fascias 10 are integrally molded so as to have openings 12 and 14 into which head lamps and a radiater grille are fitted. As is seen from FIG. 5, the bumper fascia 10 is fastened, at its rear end vertical flanges 16, to front end vertical flanges 22 of a front fender panel 24 through bolts 18, nuts 20 and retainers 26.

However, the bumper structures of he above-mentioned type has the following drawbacks.

As the size of the bumper fascia 10 becomes increased, the same tends to be distorted in shape due to inevitable thermal contraction at its molding process.

Thus, if the bumper fascia 10 having been outwardly distorted is mounted onto the front fender panel 24, it tends to occur that, as is seen from FIG. 7, a rear upper end of the bumper fascia 10 mismates with a front upper end of the front fender panel 24 leaving a considerable gap "A" therebetween. Designated by numeral 28 in FIG. 7 is a hood panel for the engine room. Furthermore, as is seen from FIG. 6, because of the thermal contraction of the bumper fascia 10, it tends to have an undesirable gap "B" betwen a rear outer end of the bumper fascia 10 and a front outer end of the front fender panel 24. These gaps "A" and "B" lower the external appearance of the front face of the motor vehicle.

SUMMARY OF THE INVENTION

Therefore, it is an object of the present invention to provide a bumper structure of a type having a bumper fascia, which is free of the above-mentioned drawbacks.

According to a first aspect of the present invention, there is provided a bumper structure which features a first bracket secured to a front fender panel near an inwardly bent first flange of the front fender panel, a bumper fascia having an inwardly bent second flange which is mated with the first flange, the second flange being divided into upper and lower portions leaving therebetween a slit, a main retainer extending along the lower portion of the second flange, a sub-retainer having a second bracket which is to be mated with the first bracket, first means for achieving a pivotal connection between the first flange, the lower portion of the second flange, the sub-retainer and the main retainer; and second means for connecting the upper portion of the second flange to the sub-retainer.

According to a second aspect of the present invention, there is provided a vehicle which features a front fender panel having an inwardly bent first flange, and a bumper structure which includes a first bracket secured to the front fender panel near the first flange, a bumper fascia having an inwardly bent second flange which is mated with the first flange, the second flange being divided into upper and lower portions leaving therebetween a slit, a main retainer extending along the lower portion of the second flange, a sub-retainer having a second bracket which is to be mated with the first bracket, first means for achieving a pivotal connection between the first flange, the lower portion of the second flange, the sub-retainer and the main retainer; and second means for connecting the upper portion of the second flange to the sub-retainer.

BRIEF DESCRIPTION OF THE DRAWINGS

Other objects of the present invention will become apparent from the following description when taken in conjunction whith the accompanying drawings, in which.

DETAILED DESCRIPTION OF THE INVENTION

Figure 1:
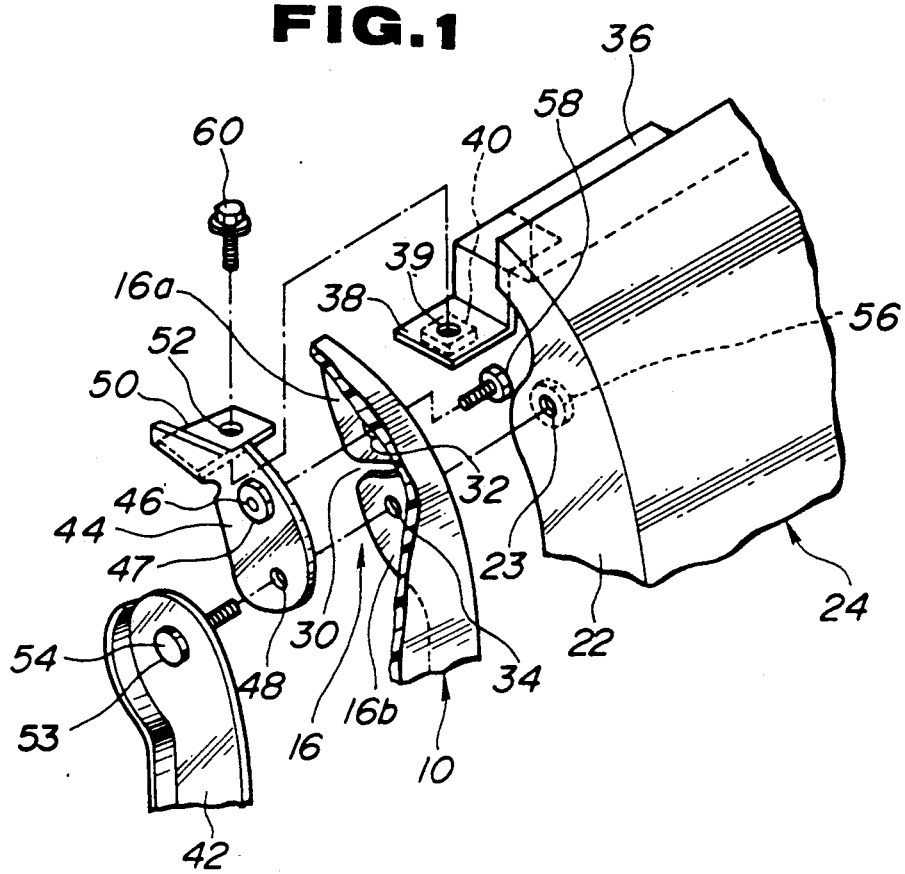
FIG. 1 is an exploded partial view of a bumper structure of the present invention.
Figure 2:
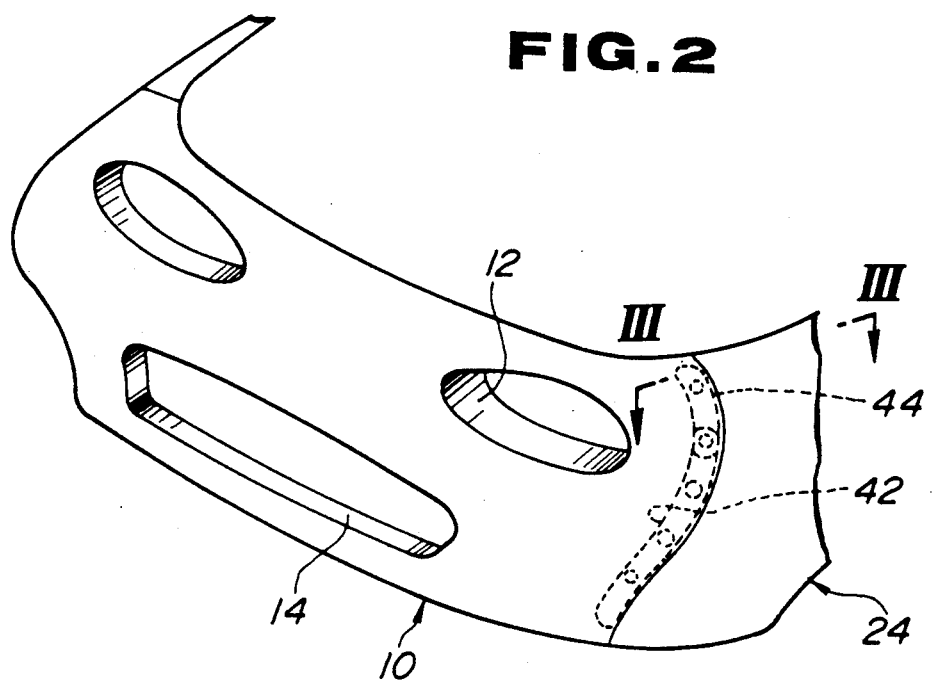
FIG. 2 is a perspective view of a bumper structure of the present invention.
Figure 3:
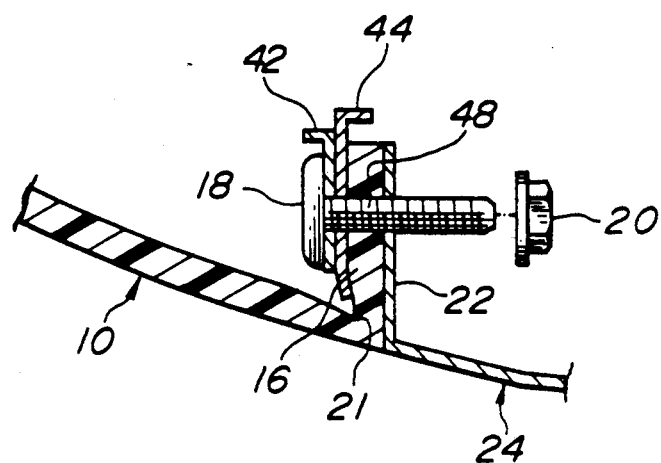
FIG. 3 is a sectional view taken along the line III—III of FIG. 2.
Figure 4:
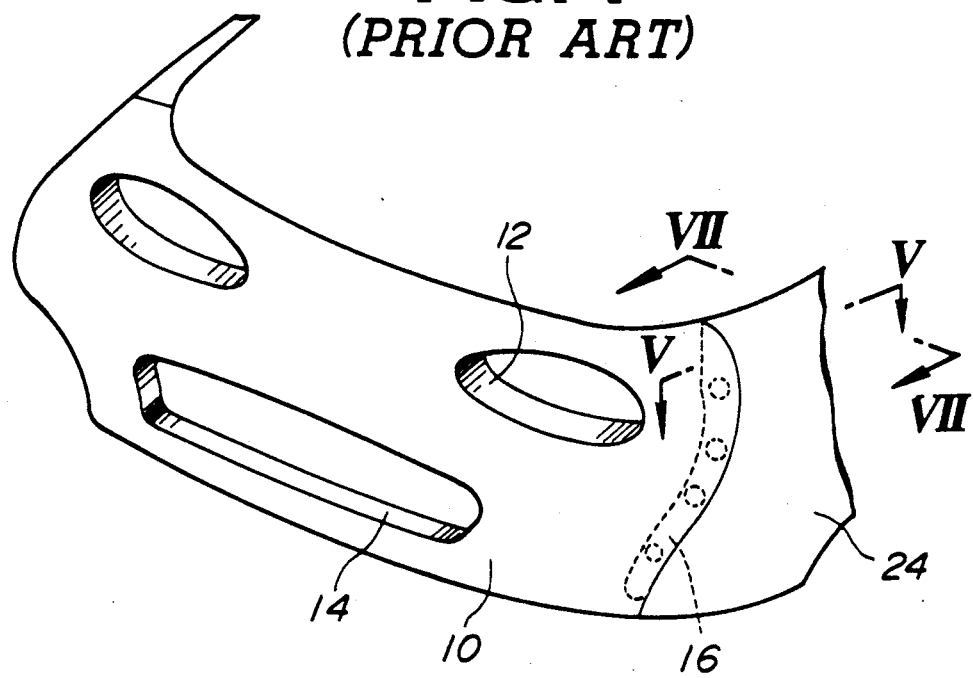
FIG. 4 is a view similar to FIG 2, but showing a conventional bumper structure.
Figure 5:
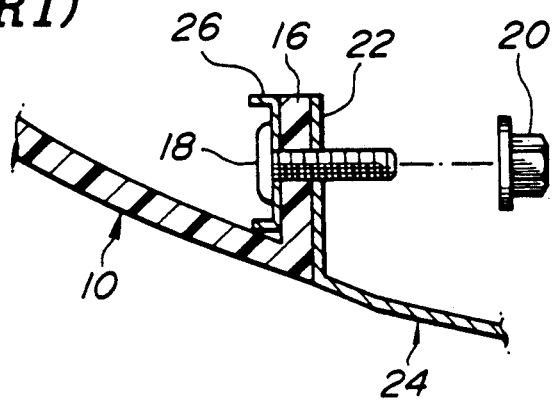
FIG. 5 is a sectional view taken along the line V—V of FIG. 4.
Figure 6:
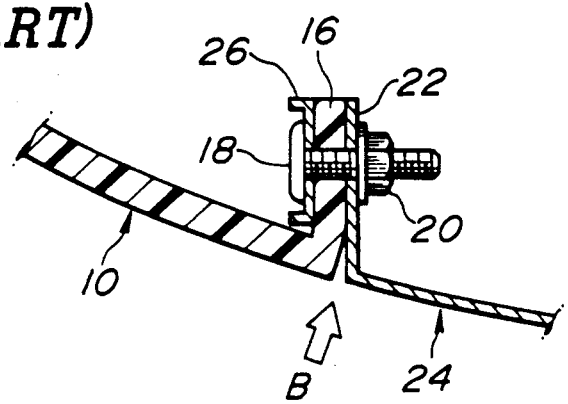
FIG. 6 is a view similar to FIG. 5, but showing a gap between the bumper fascia and the front fender panel.
Figure 7:
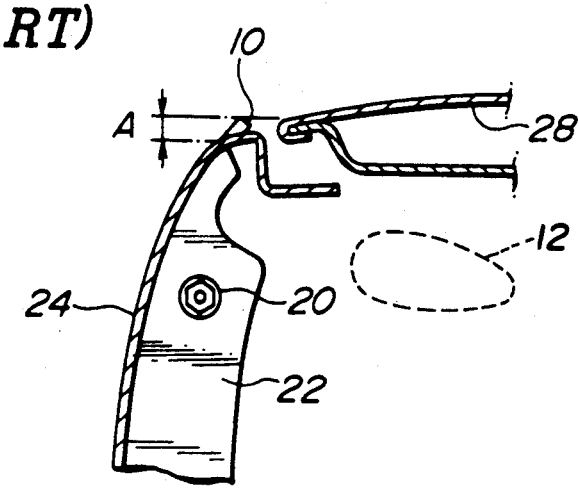
FIG. 7 is a sectional view taken along the line VII—VII of FIG. 4.

Referring to FIGS. 1-3, particularly FIG. 1, there is shown a bumper structure of the present invention. Similar to the above-mentioned conventional bumper structure, the bumper fascia 10 of the present invention is integrally molded so as to have openings 12 and 14 into which head lamps and a radiater grille are fitted (see FIG. 2). As is seen from FIG. 2, rear upper end portions of the bumper fascia 10 are inwardly curved.

As is seen from FIG. 1, the bumper fascia 10 is integrally formed, at rear end portions thereof, with vertical rear end flanges 16.

A slit 30 is formed in the flange 16 so as to divide the same into an upper small portion 16a and a lower elongate portion 16b. Therefore, at least the upper portion 16a can be flexed with a small external force. The upper portion 16a is formed with a bolt hole 32. The lower portion 16b is formed with a plurality of bolt holes 34 (only one is shown) at a certain interval therebetween.

A front fender panel 24 is made of metal and is formed, at a front end portion and an upper end portion thereof, with a vertical front end flange 22 and a horizontal upper end flange 36, respectively. The front end flange 22 is formed with a plurality of bolt holes 23 (only one is shown). Upon assembly, the bolt holes 23 of the front fender panel 24 and the bolt holes 34 of the bumper fascia 10 are mated for accomodation of bolts 54 therethrough. The horizontal upper end flange 36 has a downward step at a front end portion thereof, which step defines a forwardly extending bracket 38. The bracket 38 has a bolt hole 39 formed therethrough and a nut 40 welded to the bottom surface thereof.

An elongate main retainer 42 is formed with a plurality of bolt holes 53 (only one is shown) which are aligned with the above-mentioned bolt holes 23 and 34.

The main retainer 42 is so sized as to extend along the lower elongate portion 16b of the rear end flange 16 of the bumper fascia 10.

A sub-retainer 44 is formed with two bolt holes 46 and 48. A nut 47 is welded to the sub-retainer 44 in a manner to be aligned with the upper hole 46. The sub-retainer 44 has a rearwardly extending horizontal bracket 50 which has a bolt hole 52 at a center thereof.

As is seen from FIG. 3, the rear end flange 16 of the bumper fascia 10 is formed at its inside root portion with a notch 21 to reduce the thickness of the root portion. Therefore, the degree of the thermal contraction at this root portion is considerably reduced and thus the undesirable gap between a rear outer end of the bumper fascia 10 and a front outer end of the front fender panel 24 is not produced or at least is minimized. An outer portion of the sub-retainer 44 is so bent as to fit the inside root portion of the rear end corner portion.

The mounting procedure of the bumper fascia 10 onto the front fender panel 24 will be described in the following.

First, the bumper fascia 10 is put, at the rear end flange 16 thereof, on the front end flange 22 of the front fender panel 24 in a manner to align each hole 34 with the corresponding bolt hole 23. Then, the sub-retainer 44 is put on the front face of the rear end flange 16 in a manner to align the bolt holes 46 and 48 with the bolt holes 32 and 34, respectively. Thus, the slit 30 is covered with the sub-retainer 44. Then, the elongate main retainer 42 is put on the lower elongate portion 16b of the rear end flange 16, with an interposal of a lower portion of the sub-retainer therebetween in a manner to align the bolt holes 53 with the bolt holes 23, 34 and 48.

Then, the sub-retainer 44 is connected to the upper small portion 16a of the rear end flange 16 by means of a bolt 58 and a nut 47 which is welded to the sub-retainer 44. The front end flange 22 of the front fender panel 24 is partially cut out in a manner not to bring the same into contact with the head of the bolt 58.

Then, the rear end flange 16 of the bumper fascia 10 is fastened to the front end flange 22 of the front fender panel 24 together with the elongate main retainer 42 and sub-retainer 44 by means of a plurality of bolts 54 which pass through the aligned bolt holes of them. Designated by numeral 56 are nuts for fastening the bolts 54.

It is thus to be noted that the sub-retainer 44 is connected to the upper and lower portions 16a and 16b of the rear end flange 16 of the bumper fascia 10 through the respective bolts 58 and 54. Thus, when a certain external force is applied to the sub-retainer 44, the latter is forced to turn about the bolt 54 flexing the upper small portion 16a of the flange 16. This is achieved by the provision of the slit 30 in the flange 16.

When, as has been mentioned hereinafore, the rear upper end portion of the bumper fascia 10 is outwardly distorted because of the thermal contraction at the molding process, the outer surface of the rear upper end portion of the bumper fascia 10 fails to conform to the outer surface of the front upper end portion of the front fender panel 24. In this case, the rearwardly extending bracket 50 is away from the forwardly extending bracket 38.

However, in the present invention, the above-mentioned undesired matter is easily cured by taking the following steps.

That is, in such case, the sub-retainer 44 is forced to rotate in a direction to inwardly flex the upper portion 16a of the rear end flange 16 until the outer surface of the rear upper end portion of the bumper fascia 10 conforms to the outer surface of the front upper end portion of the front fender panel 24. With this, the rearwardly extending bracket 50 is placed on the forwardly extending bracket 38 in a manner to align the bolt hole 52 with the bolt hole 39. Then, the bracket 50 is fastened to the bracket 38 with a bolt 60 and the nut 40. With this, the outer surface of the rear upper end portion of the bumper fascia 10 is conformed with the outer surface of the front upper end portion of the front fender panel 24, thereby enhancing the external appearance of the front face of the motor vehicle.

What is claimed is:

1. A bumper structure for a vehicle, comprising:
   a first bracket secured to a front fender panel near an inwardly bent first flange of said front fender panel;
   a bumper fascia having an inwardly bent second flange which is mated with said first flange, said second flange being divided into upper and lower portions leaving therebetween a slit;
   a main retainer extending along said lower portion of said second flange;
   a sub-retainer having a second bracket which is to be mated with said first bracket;
   first means for achieving a pivotal connection between said first flange, said lower portion of said second flange, said sub-retainer and said main retainer; and
   second means for connecting said upper portion of said second flange to said sub-retainer.

2. A bumper structure as claimed in claim 1, in which said first means comprises a bolt, a nut and aligned bolt holes, said aligned bolt holes being formed through said first flange, said lower portion of said second flange, said sub-retainer and said main retainer, said bolt being passed through said aligned bolt holes and fastened by said nut.

3. A bumper structure as claimed in claim 2, in which said second means comprises a bolt, a nut and aligned bolt holes, said aligned bolt holes being formed through said upper portion of said second flange and said sub-retainer, said bolt being passed through said aligned bolt holes and fastened by said nut.

4. A bumper structure as claimed in claim 3, in which said second flange is formed at an inside root portion thereof with a notch.

5. A bumper structure as claimed in claim 4, in which an outer portion of said sub-retainer is so bent as to fit to the notched portion of said root portion.

6. A bumper structure as claimed in claim 5, in which said first and second brackets are respectively formed with bolt holes through which a bolt passes to achieve a secured connection between the first and second brackets.

7. A bumper structure as claimed in claim 2, in which said nut is welded to said first flange.

8. A bumper structure as claimed in claim 3, in which said nut is welded to said sub-retainer.

9. A bumper structure as claimed in claim 1, in which said main retainer is so sized as to extend along said lower portion of said second flange.

10. In a vehicle,
    a front fender panel having an inwardly bent first flange; and
    a bumper structure which includes:
    a first bracket secured to said a front fender panel near said first flange;

a bumper fascia having an inwardly bent second flange which is mated with said first flange, said second flange being divided into upper and lower portions leaving therebetween a slit;

a main retainer extending along said lower portion of said second flange;

a sub-retainer having a second bracket which is to be mated with said first bracket;

first means for achieving a pivotal connection between said first flange, said lower portion of said second flange, said sub-retainer and said main retainer; and second means for connecting said upper portion of said second flange to said sub-retainer.

* * * * *